(12) United States Patent
Hasegawa et al.

(10) Patent No.: US 6,169,854 B1
(45) Date of Patent: Jan. 2, 2001

(54) DISPLAY DEVICE CONNECTABLE TO A CAMERA

(75) Inventors: Yasushi Hasegawa; Takashi Kato, both of Sakai; Masayasu Hirano, Itami; Toru Kasai, Osaka; Chisato Kasuya, Tokyo; Koichi Ujike, Otsu; Satoshi Yokota, Toyonaka, all of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/332,370

(22) Filed: Jun. 14, 1999

(30) Foreign Application Priority Data

Jun. 17, 1998 (JP) .................................................. 10-170208

(51) Int. Cl.[7] .................................................. G03B 17/18
(52) U.S. Cl. .................................................. 396/56
(58) Field of Search .................. 396/283, 319, 396/300, 56, 57, 59; 348/211

(56) References Cited

U.S. PATENT DOCUMENTS

| | | | |
|---|---|---|---|
| 4,346,978 | * 8/1982 | Taniguchi et al. | 396/283 |
| 4,367,933 | * 1/1983 | Sahara | 396/283 |
| 4,389,109 | * 6/1983 | Taniguchi et al. | 396/283 |
| 4,965,627 | * 10/1990 | Robison | 396/319 |
| 5,614,969 | 3/1997 | Izukawa | 396/319 |

FOREIGN PATENT DOCUMENTS 55-155338   3/1980   (JP) .

* cited by examiner

*Primary Examiner*—W. B. Perkey
(74) *Attorney, Agent, or Firm*—McDermott, Will & Emery (57) ABSTRACT

A camera having a display unit that displays information regarding the functions of the camera and the photo-taking scenes in an abbreviated fashion by means of characters, symbols and/or codes, a voice synthesizer that provides information regarding the functions of the camera and the photo-taking scenes by means of voice sounds and a magnetic head that records the information regarding the photo-taking scenes (the photo-taking dates and titles) in the recording area of the film. Consequently, this camera provides by means of voice sounds information that may not be fully displayed in the display unit.

9 Claims, 9 Drawing Sheets

DISPLAY DEVICE CONNECTABLE TO A CAMERA

RELATED APPLICATION

This application is based on application No. Hei 10-170208 filed in Japan, the content of which is hereby incorporated by reference.

BACKGROUND OF THE INVENTION

1. Field of the Invention

The present invention pertains to a camera and a camera system that have a character display unit and a voice synthesizer inside the camera main unit or in a peripheral device.

2. Description of the Related Art

As described in Japanese Laid-Open Patent Application Sho 55-155338, for example, cameras that issue voice warnings related to their operation, such as 'use flash' and 'replace film', have conventionally been known. These cameras use 135 film, and include a flash unit and a function to optically record the date and time at which the photograph was taken. They also include a liquid crystal display unit on which the date of photo-taking, and other information is displayed.

On the other hand, APS cameras, which have been increasing in popularity in recent years, have a flash unit and their photo-taking lenses are capable of zooming. Further, they are also capable of recording the dates of photo-taking and the titles of the photos in the magnetic recording area of the film. Where a title is to be recorded in the magnetic recording area of the film, two methods are available: (1) a method in which one title is selected from among multiple titles that are stored in the ROM in advance and (2) a method in which the user operates the character input switches to input the title through the sequential input of characters.

APS cameras must have a number of operation buttons even though the camera itself is reduced in size in comparison with conventional 135 film cameras. Consequently, the area of the display unit screen cannot be made large. On the other hand, because APS cameras have more functions than conventional 135 film cameras and have many items to be displayed on the display unit, where all of the available functions of the camera are to be displayed together, icons symbolizing each of the camera's functions are used. Moreover, where a title to be recorded in the magnetic recording area of the film is selected, the selected title is displayed in an abbreviated fashion by using a combination of characters and numbers.

Cameras having the voice warning function described above provided voice warnings regarding low photo object brightness and film expiration. These warnings had conventionally been given by means of light emission from an LED or through a beeping sound. However, cameras of that generation had a single focal point lens and did not have a mechanism to perform switching between standard and panoramic photo-taking, or a function to magnetically record titles. In short, their functions were relatively simple. Therefore, the number of items covered by the voice warnings was relatively limited, and the cameras also did not have a character input function.

Furthermore, because the displayed icons in conventional APS cameras are very small and symbolic, it is difficult for the user to understand what functions they represent. It was also impossible for the user to read and quickly understand the titles, which were displayed in an abbreviated fashion. This required the user to carry the camera's instruction manual at all times in order to be able to check the functions of the camera displayed in the form of icons and the meanings of the titles from which to make selections. An additional problem was that where the user sought to input the title through the sequential input of characters, because the area of the screen of the display unit was small and the number of characters that could be displayed was small, the title could not be fully displayed.

SUMMARY OF THE INVENTION

The object of the present invention is to resolve the problems presented above.

Another object of the present invention is to provide a camera and a camera system that display explanations and warnings regarding the camera's functions and the meanings of the selected titles in the display unit by means of characters or symbols and that provide the same information to the user by means of voice sounds.

These and other objects are attained by a camera having a display unit that displays a first set of information that pertains to the functions of the camera and provides by means of voice sounds a second set of information that is more detailed than the first set of information.

These and other objects are attained by a camera system having a camera main unit and a peripheral device, wherein the camera main unit has (i) a first display unit that displays a first set of information that pertains to function of the camera by means of character, symbol or code or a combination thereof, and (ii) a transmitter that sends signals corresponding to the first set of information thus displayed, and the peripheral device has (i) a receiver that receives the signals sent from the transmitter, (ii) a second information set forming unit that forms in accordance with the signals received a second set of information having the same contents as the first set of information, (iii) a second display unit that displays the second set of information by means of character, symbol or code or a combination thereof, and (iv) a voice synthesizer that provides the second set of information by means of voice sounds.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

First Embodiment

Figure 1:
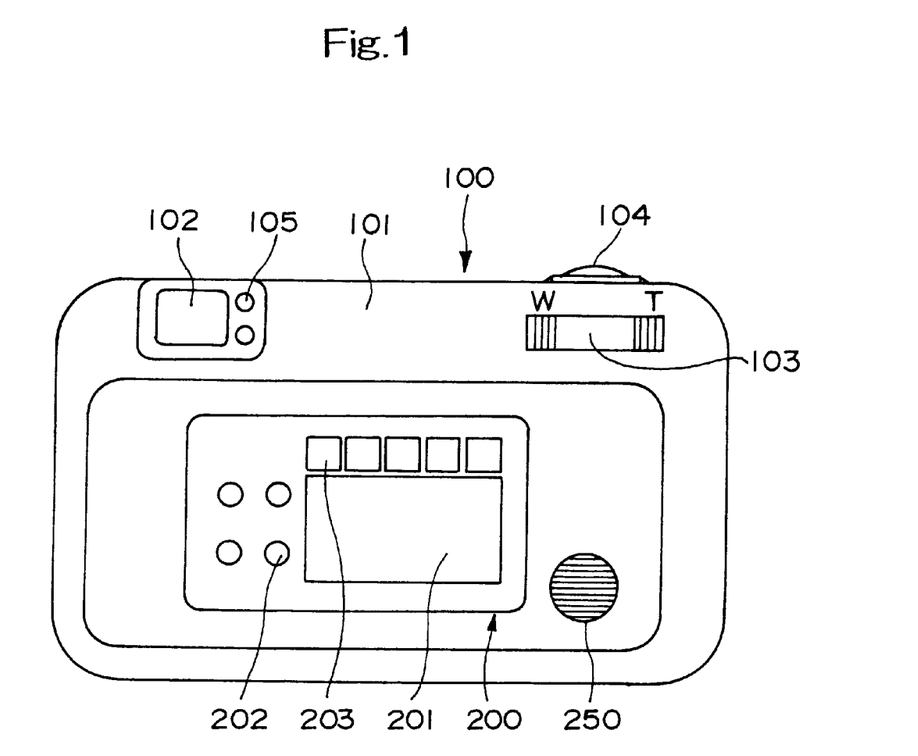
FIG. 1 is a drawing showing a camera pertaining to the first embodiment.

The first embodiment of the present invention will be explained with reference to FIGS. 1 through 5. FIG. 1 shows the backside 101 of the camera 100 pertaining to the first embodiment. On the back side 101 of the camera 100 are located a finder eye piece 102, a zoom switch 103 to change the focal length of the lens, light emitting display elements 105, a liquid crystal display unit 200 to display various photo-taking data such as dates, and a speaker 250 to provide the information regarding the functions of the camera 100 and the photo-taking scenes by means of voice sounds. A shutter release button 104 is located on the top side of the camera 100.

The light emitting display elements 105 notify the user who is looking into the finder eye piece 102 that the lens has focused on the photo object and that the charging of the condenser for flash light emission has been completed, by changing the color of the light emission through using multiple LEDs having different colors of light emission, or by changing the length of the light emission period.

The liquid crystal display unit 200 comprises a display unit 201 consisting of a liquid crystal display element, selection switches 202 to perform switching of the display in the display unit 201 and the operating mode of the camera, an operating mode display unit 203 to display the camera's available operating modes, and a circuit board not shown in the drawing. The elements are combined so as to form one unit. The circuit board includes a display controller to control the display unit 201 as well as a voice synthesizer to provide information by means of voice sounds regarding the selected functions of the camera (the control modes) and the photo-taking scenes to be recorded on the film.

Figure 2:
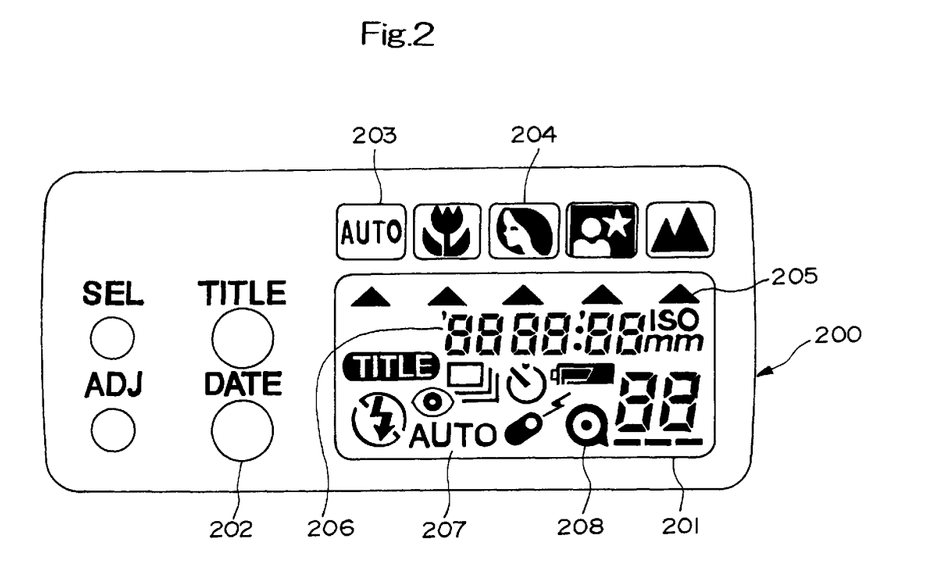
FIG. 2 is a drawing showing the details of the surface of the liquid crystal display unit of the camera.

FIG. 2 shows the details of the surface of the liquid crystal display unit 200. It shows a situation in which all characters, symbols and codes that may be displayed in the display unit 201 are being displayed. The selection switches 202 are located to the left of the display unit 201. The characters 'SEL', 'TITLE', 'ADJ' and 'DATE' that indicate the function of each selection switch 202 are printed near each selection switch 202. The operating mode display unit 203 is located in the upper area of the display unit 201 and includes printed characters or symbols 204 that indicate the function of each operating mode. A triangular mark 205 to display the selected function is located in the area of the display unit 201 that faces the operating mode display unit 203. A segment 206 to display the date and time as well as relatively simple characters such as letters and katakana characters is located in the center area of the display unit 201. In the bottom area of the display unit 201 are shown in the form of icons using characters, symbols or codes camera operating mode displays 207 that indicate the use of a flash, the use of a remote control device and the use of the self-timer, as well as warning displays 208 pertaining to inadequate battery capacity and missing film.

For example, when the button indicated as 'SEL' is pressed, the triangular mark 205 in the display unit 201 moves from the left to the right in the drawing, such that the triangular mark 205 cycles through the operating modes available with the camera 100 to enable the user to select one mode. Simultaneously with this operation, explanations regarding the various functions of the camera, such as 'This is auto flash mode. If you . . . , the flash will be illuminated', are provided using voice sounds in English or in Japanese.

When the button indicated as 'TITLE' is pressed, the combination of letters and numbers displayed in the segment 206 changes, for example, so that the user may cycle through preset items of information regarding a photo-taking scene, i.e., titles indicated by a combination of letters and numbers, such as 'BD: birthday' and 'AM: athletic meeting', and select an appropriate title. Where the camera 100 is an APS camera or a digital camera, the title is recorded in the recording area of the film or the magnetic card. Simultaneously with this operation, the words 'birthday' or 'athletic meeting' are issued from the speaker 250 in English or in Japanese.

Figure 3:
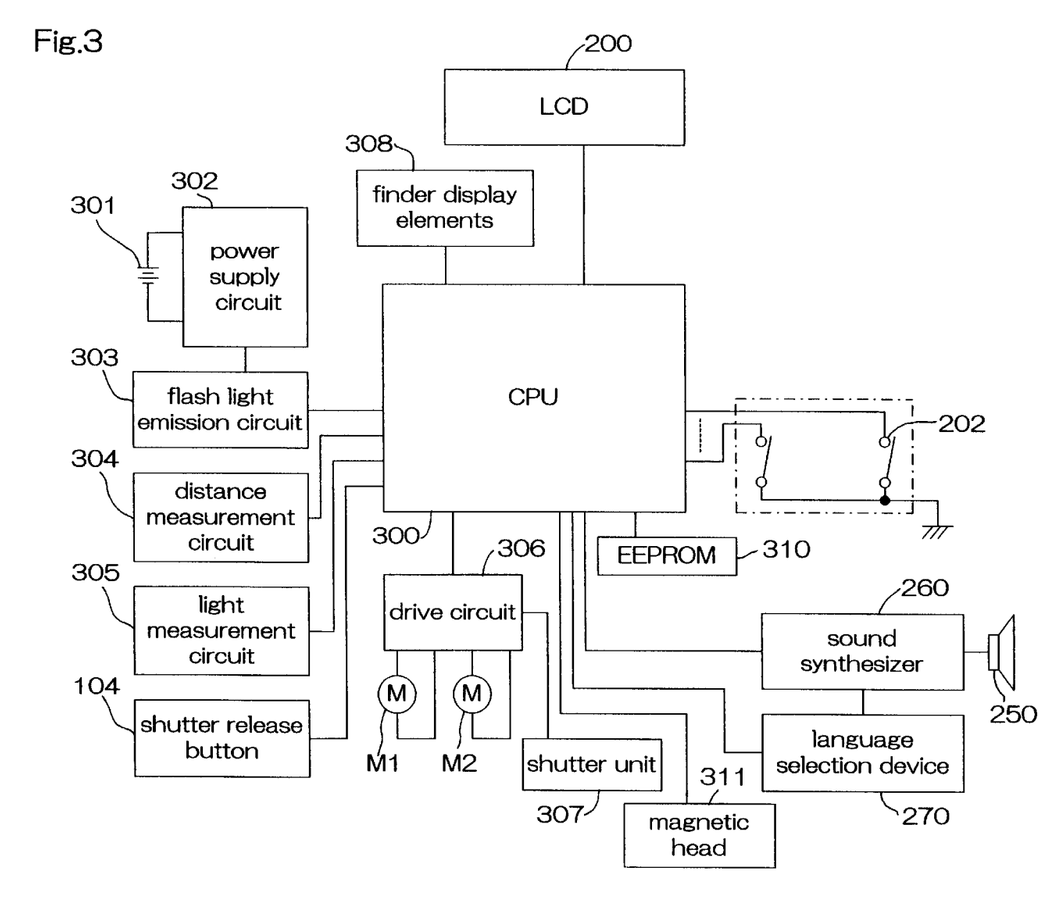
FIG. 3 is a block diagram showing the control circuit of the camera.

FIG. 3 shows a block diagram of the control circuit of the camera 100. The power supply circuit 302 connected to the battery 301 applies a prescribed drive voltage to the CPU 300. It also converts the direct current having a prescribed voltage into an alternating current having a prescribed frequency and voltage, and charges the condenser of the flash light emission circuit 303 (not shown in the drawing). The liquid crystal display unit 200, the shutter release button 104, the operating switches 202, the voice synthesizer 260 and the language selection device 270 are connected to the CPU 300. Also connected to the CPU 300 are a distance measurement circuit 304 to detect whether or not the lens is focusing on the photo object, a light measurement circuit 305 to measure the brightness of the photo object, a drive circuit 306 to drive the lens drive motor M1, the film feed motor M2 and the shutter unit 307, finder display elements 308 comprising LEDs located inside the finder to perform in-focus display, flash display and hand shake warning, a non-volatile memory (EEPROM) 310 to store characters for the preset titles and a magnetic head 311 to record the photo-taking data and titles in the magnetic recording area of the film. A speaker 250 is connected to the sound synthesizer 260.

The language selection device 270 comprises a selection switch and a ROM, and in it are stored data and programs needed to synthesize voice sounds for such languages as Japanese, English, French, German, Arabic and Chinese. The voice synthesizer 260 reads the data and program required for voice sound synthesis for the language selected by means of the selection switch of the language selection device 270, synthesizes voice sounds using the data and program, and drives the speaker 250.

One example of the photo-taking operation of the camera 100 will now be explained with reference to the flow charts shown in FIGS. 4 and 5. It is assumed that film is already mounted in the camera 100, and the method by which to mount the film in the camera will not be explained.

First, when the power supply switch (not shown in the drawings) of the camera 100 is turned ON (step S100), the CPU 300 resets the settings of the camera 100 (step S105) and determines whether or not any of the operating switches 202 has been turned ON (step S110).

Where an operating switch 202 has been turned ON (YES in step Silo), the CPU 300 determines in response to the type of the operating switch 220 that was operated (specifically, the indications 'SEL' and 'TITLE' next to the switches) whether the selection pertains to the camera's operating modes or titles (step S115). Where the 'operating mode' is selected, the triangular mark 205 in the display unit 201 is moved. Where the 'title' is selected, a combination of letters and numbers to display a title in an abbreviated fashion is displayed in the segment 206 of the display unit 201 and the contents of the display in the display unit 201 are changed (step S120). At the same time, the CPU 300 controls the voice synthesizer 260 to synthesize the voice sounds to phonetically express the camera's operating modes or the titles selected, and drives the speaker 250 to provide the information to the user by means of voice sounds (step S125). Because the operating modes and titles shown in the display unit 201 are displayed in terms of icons or abbreviations, it is difficult for the user to easily understand the meanings of the operating modes (i.e., the camera's functions) or the titles selected without further explanations. Conventionally, the user had to refer to the camera's instruction manual, but since verbal information is provided by means of the voice synthesizer in this embodiment, the user can easily learn whether the selected operating mode or title accords with his or her wishes.

If none of the operating switches 202 is operated in step S110 (YES in step S110) and if verbal information was provided instep S125, the CPU 300 determines whether or not a certain period of time has passed (step S130). If none of the operating switches 202 is operated during this period (YES in step S130), the CPU 300 determines that the user has finished with the setting of the operating mode or title, confirms the settings (step S135) and enters the state in which photo-taking is enabled.

It is assumed that the so-called full-auto mode, in which the flash unit automatically emits light when the brightness of the photo object is low, for example, is selected in this explanation. The CPU 300 determines whether or not the switch S1 (not shown in the drawings) that becomes ON when the shutter release button 104 is pressed halfway is ON (step S140). Where the switch S1 is ON (YES in step S140), the CPU 300 activates the distance measurement circuit 304 (step S145) and determines whether or not the lens is focusing on the photo object, i.e., whether or not the lens is in focus (step S150). Where the lens is not in focus (NO in step S150), the CPU 300 drives the lens drive motor M1 via the drive circuit 306 to perform the focusing operation (for example, by moving the lens from the infinity focal position toward the closeup position) (step S155). As the lens is moved, the signal from the distance measurement circuit 304 changes. When the CPU 300 detects that the lens has focused on the photo object based on the signal from the distance measurement circuit 304, it stops the driving of the lens drive motor M1 via the drive circuit 306.

Simultaneously with the focusing operation, the light measurement circuit 305 measures the brightness of the photo object (step S160). The CPU 300 determines the aperture value for the lens and the shutter speed in accordance with a preset program based on the signal from the light measurement circuit 305 (step S165).

Here the CPU 300 determines whether or not the shutter speed that it has determined is slower than the maximum shake limit that is preset for the focal length of the lens (step S170). If the shutter speed is slower than the maximum shake limit (YES in step S170), the CPU 300 selects flash light emission (step S175). It then changes the lens aperture value and the shutter speed in response to the flash guide number (light emission amount) (step S180). If the shutter speed is faster than the maximum shake limit (NO in step S170) and if the aperture value and the shutter speed were changed in step S180, the CPU 300 displays the such photo-taking parameters on the liquid crystal display unit 200 as the in-focus display, the lens aperture value, the shutter speed and the flash display (step S185).

The CPU 300 then determines whether or not the switch S2 (not shown in the drawings) that turns ON when the shutter release button 104 is further pressed down is ON (step S190). Where the switch S2 is ON, the CPU 300 drives the shutter unit 307 via the drive circuit 306 using the determined shutter speed, and drives the flash light emission circuit 303 where necessary to perform exposure of the film to form the photo object image on the film (step S195).

When exposure is completed, the CPU 300 drives the film feed motor M2 via the drive circuit 306 to feed the film forward by one frame. At the same time, it charges the shutter unit 307 (step S200). Simultaneously with the film feeding operation, the CPU 300 records such data as the title, the date of photo-taking, the orientation of the camera during photo-taking and the screen size (i.e., standard size or panoramic size) in the magnetic information recording area located above or below each frame and on the back side of the film (step S205). When the feeding of the film is completed, the displays of such photo-taking parameters as the in-focus display, the aperture value for the lens, the shutter speed and the flash display are removed and the screen is returned to the standard display (step S210). Further, the CPU 300 determines whether or not the frame as to which photo-taking has been performed is the last frame of the film (step S215), and if it is the last frame (YES in step S215), it rewinds the film into the film cartridge (step S220). When the rewinding of the film is completed, the CPU 300 displays a symbol representing 'No film' in the warning display area 135 of the liquid crystal display element 131 (step S225) and provides the verbal notification 'Please replace the film' through the speaker 250 by controlling the voice synthesizer 260 (step S230).

Where the switch S2 is not ON in step S190, i.e., where the shutter release button 104 has not been pressed further down, and where it was not determined that the frame was the last frame of the film in step S215, the CPU 300 determines whether or not the switch S1 has been turned ON in preparation for the next photo-taking session (step S140).

As described above, using the first embodiment, the information regarding the camera's operating modes and the titles, which conventionally were only displayed in an abbreviated fashion in the display unit 201 of the liquid crystal display unit 200, is provided by means of voice sounds via the voice synthesizer 260 and the speaker 250. Consequently, the user can easily learn the meaning of the information without referring to the instruction manual of the camera. In addition, because many more words can be used when information is provided by means of voice sounds in comparison with the number of words that may be displayed by means of the liquid crystal display unit 200, not only the operating modes and the titles, but also more detailed information regarding the selected operating mode, such as a hand shake warning in the 'night scene phototaking' mode or how to set the time in the 'self-timer photo-taking' mode, may be provided using the voice sounds.

Second Embodiment

Figure 6:
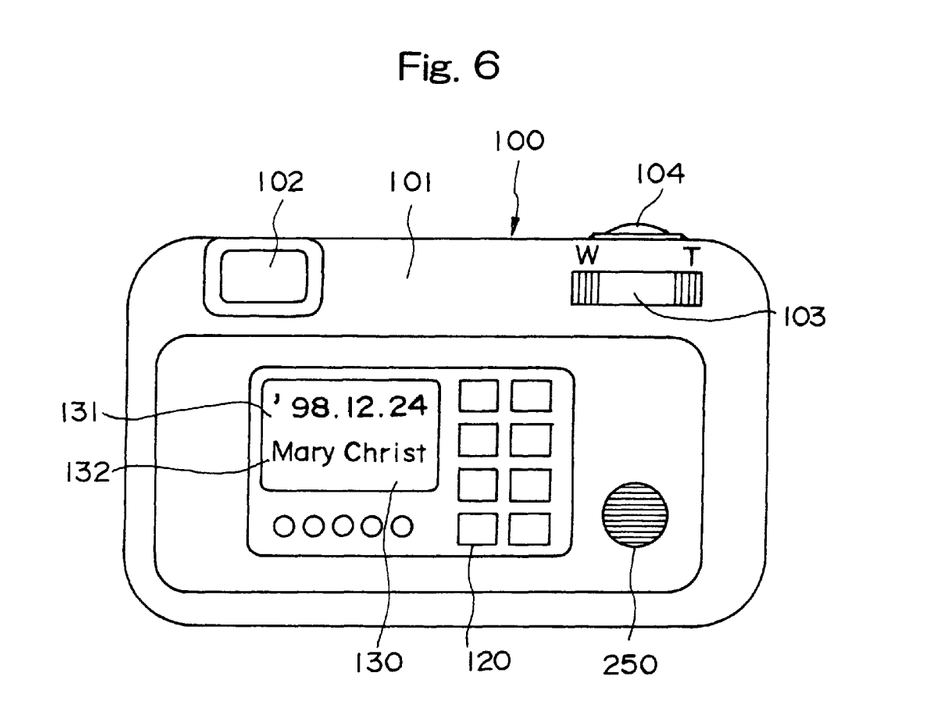
FIG. 6 is a drawing showing a camera pertaining to the second embodiment.

The second embodiment of the present invention will be explained with reference to FIGS. 6 and 7. FIG. 6 shows the back side 101 of the camera 100 pertaining to the second embodiment. In the second embodiment, information regarding the photo-taking scenes, such as the titles, for example, may be freely set by the user.

As shown in FIG. 6, on the back side 101 of the camera 100 are located a viewfinder eye piece 102, a zoom switch 103 to change the focal length of the lens, key switches 120 to input characters, numbers and/or codes to record the titles and the photo-taking data in the magnetic recording area of the APS film, a liquid crystal display unit 130 to display the date and the input characters, and a speaker 250 to provide the information regarding the functions of the camera 100 and the photo-taking scenes by means of voice sounds. A shutter release button 104 is located on the top side of the camera 100.

Multiple characters are allocated to one key switch 120. Katakana, hiragana, upper and lower case letters and numbers may be input by combining the key switches 120 with a character type setting key, which comprises one of the key switches 120.

The liquid crystal display unit 200 comprises a dot matrix over its entire display area, for example, and may display not only numbers but also characters, codes and symbols. In the state shown in FIG. 6, the liquid crystal display unit 130 is displaying a date 131 and a title 132, for example.

Figure 7:
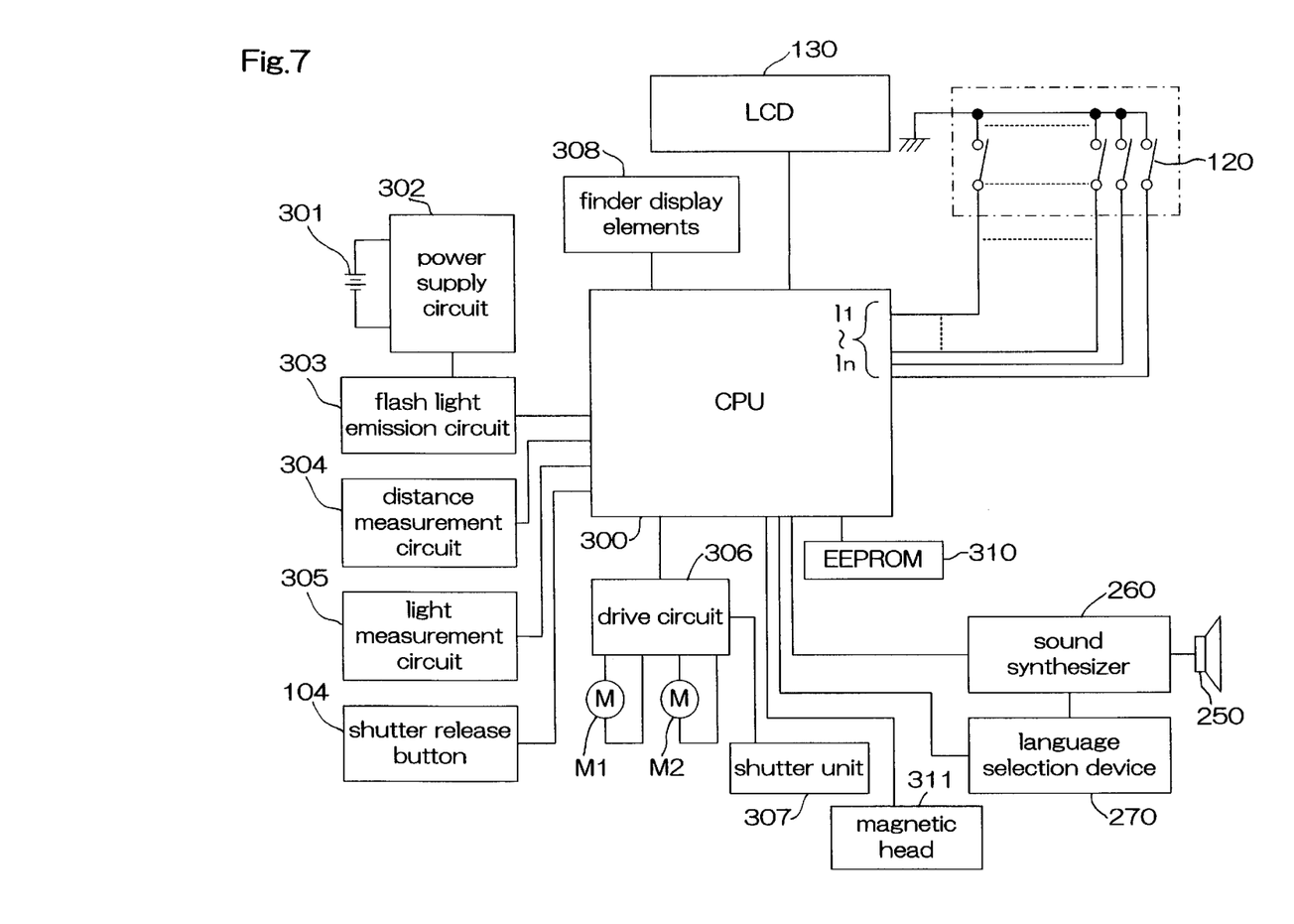
FIG. 7 is a block diagram showing the control circuit of the camera.

FIG. 7 shows a block diagram of the control circuit of the camera 100. It is basically the same as the block construction of the control circuit of the camera 100 of the first embodiment shown in FIG. 3, except that in place of the operating switches 202, the key switches 120 of the switch panel are each connected to the input ports I1 through In of the CPU 300.

Figure 4:
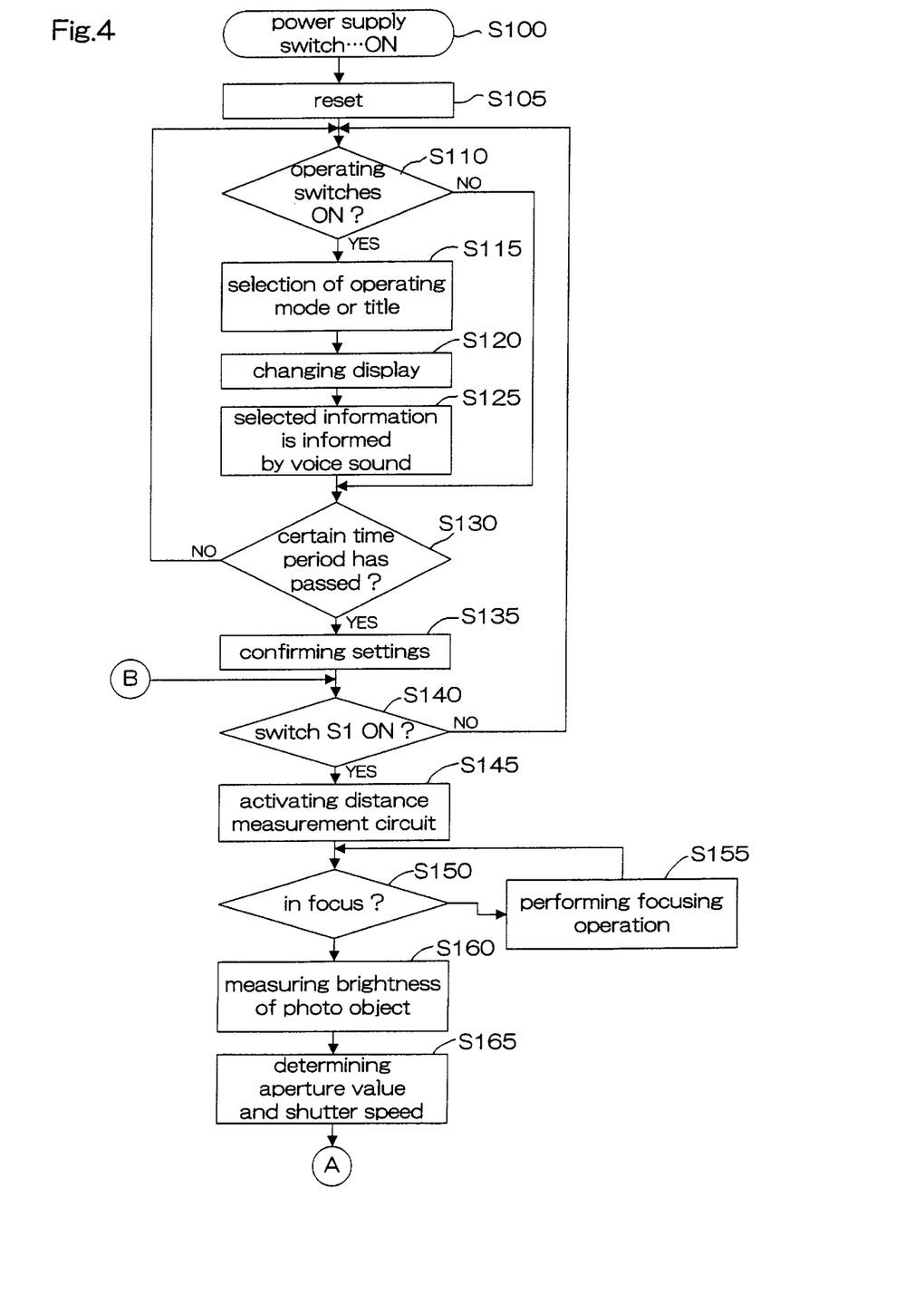
FIG. 4 is the first half of a flow chart regarding the photo-taking operation of the camera.
Figure 5:
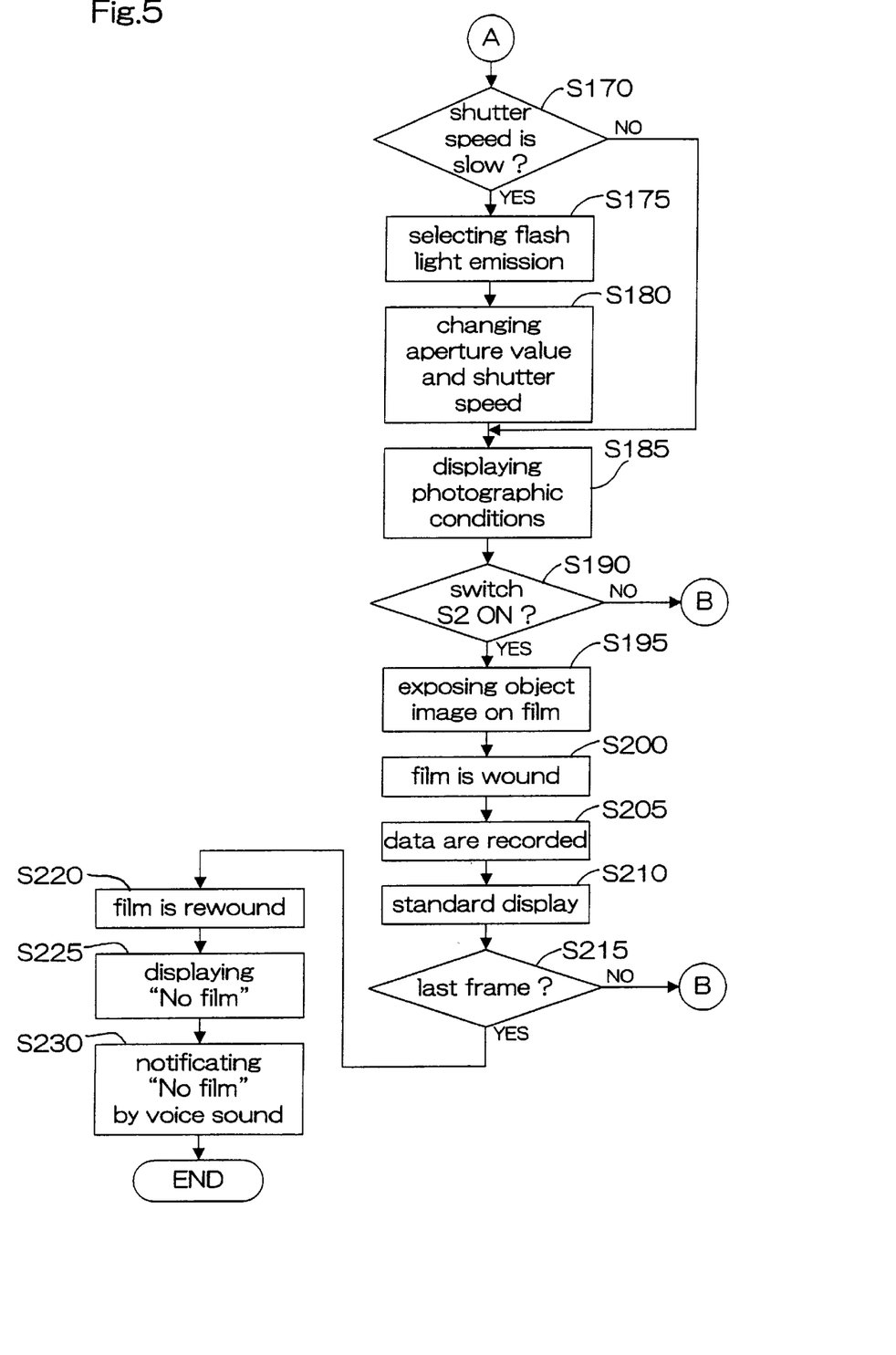
FIG. 5 is the second half of a flow chart regarding the photo-taking operation of the camera.

The operation of the second embodiment is basically the same as that of the first embodiment shown in FIGS. 4 and 5. However, the second embodiment differs from the first embodiment in that titles, which comprise information regarding the photo-taking scenes, may not only be selected from preset titles but also be created by the user by inputting characters through the operation of the key switches 120. The number of characters that may be input by the user in the second embodiment is not limited to the number of characters that may be displayed on the screen of the liquid crystal display unit 130 but by the number of characters that may be recorded in the magnetic recording area of the film. Therefore, there are cases in which all of the characters input are not displayed on the screen of the liquid crystal display unit 130, but because the words thus input are provided as voice sounds by means of the voice synthesizer 260 and the speaker 250, the user may confirm whether or not the characters were input correctly.

Third Embodiment

Figure 8:
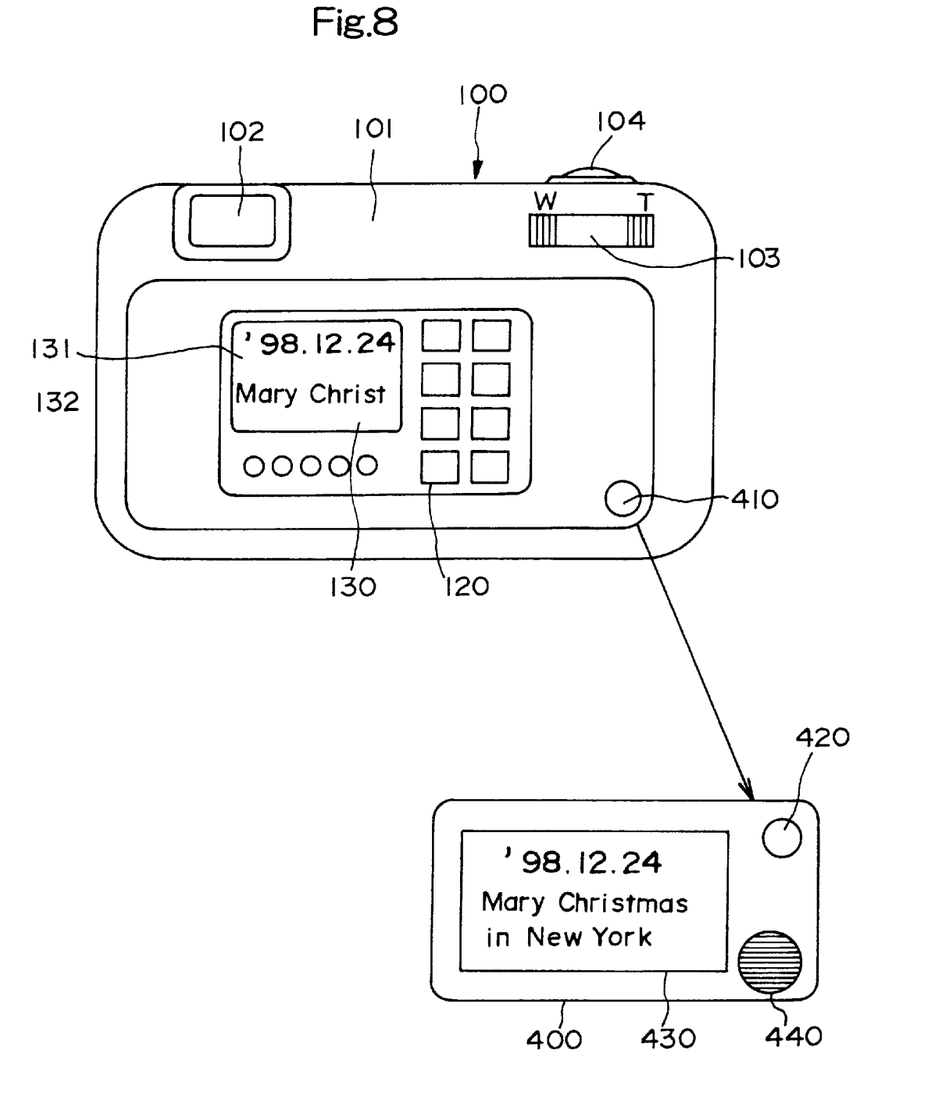
FIG. 8 is a drawing showing a camera system pertaining to the third embodiment.

The third embodiment of the present invention will be explained with reference to FIGS. 8 and 9. FIG. 8 shows a camera system pertaining to the third embodiment, including a camera main unit and a peripheral device. The parts that are common to the first and second embodiments will not be explained.

As shown in FIG. 8, the camera system of the third embodiment comprises a camera main unit 100 and a peripheral device 400 that is independent of the camera main unit 100, such as a remote control unit. A transmitter 410 is located on the back side 101 of the camera main unit 100 and a receiver 420 is located in the peripheral device 400. Prescribed signals are sent to the peripheral device 400 from the camera main unit 100 via the transmitter 410 and the receiver 420. The peripheral device 400 also includes a liquid crystal display unit 430 to display the dates and various other photo-taking data and a speaker 440 to provide information regarding the functions of the camera 100 and the photo-taking scenes by means of voice sounds. The camera main unit 100 is basically the same as the camera in the second embodiment except that it has a transmitter 410 in place of the speaker 250.

Where the peripheral device 400 comprises a remote control unit, it is made large enough to allow the u se r to easily hold it in her or his hand to ensure a certain degree of ease of use, and consequently it has a large surface area relative to the size of the actual operating members. Therefore, the screen of the liquid crystal display unit 430 located in the peripheral device 400 may be made larger than the screen of the liquid crystal display unit 130 located in the camera main unit 100. Consequently, even if a sequence of characters is too long to be completely displayed in the screen of the liquid crystal display unit 130 of the camera main unit 100, it may be completely displayed in the screen of the liquid crystal display unit 430 of the peripheral device 400, as shown in FIG. 8.

Figure 9:
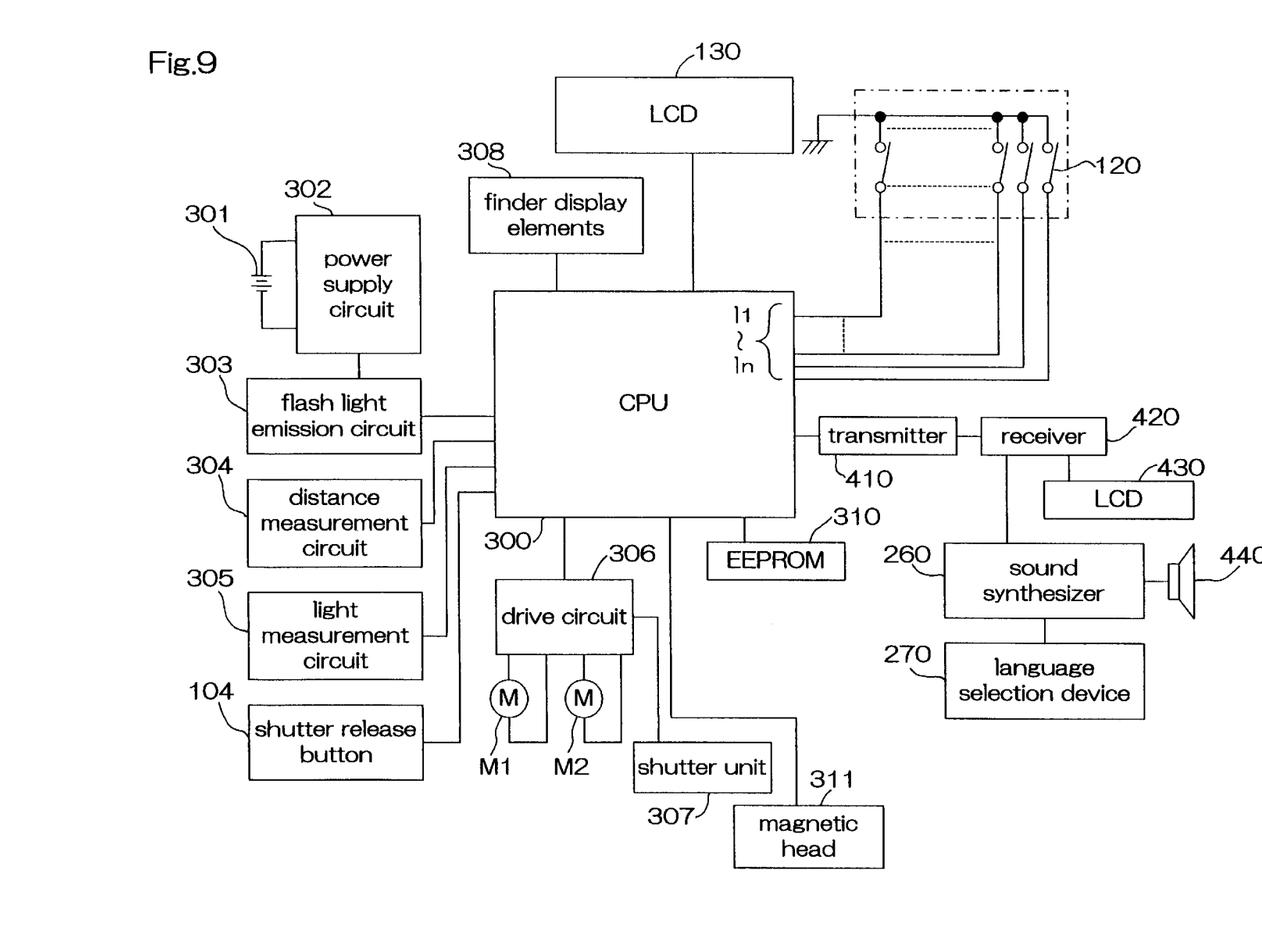
FIG. 9 is a block diagram showing the control circuit of the camera system.

FIG. 9 shows a block diagram of the control circuit of the camera system. The control circuit is basically the same as the one shown in FIGS. 3 or 7 with reference to the first or second embodiments, except that a transmitter 410 and a receiver 420 exist between the CPU 300 and the voice synthesizer 160. In addition, a second liquid crystal display unit 430 is connected to the receiver 420 such that information is displayed that is equally or more detailed than that displayed in the first liquid crystal display unit 130.

Other Embodiments

In the embodiments explained above, an APS camera that may record information regarding the photo-taking scenes, i.e., the dates of photo-taking and titles, in the magnetic recording area of the film was shown as an example of the camera 100. However, the present invention is not limited to this implementation. The camera may comprise a conventional camera that uses 135 film or 120 film or a digital camera or video camera that records the image data in a magnetic recording medium.

Further, a language selection device 270 was used in the embodiments such that the user can select one language from among multiple languages. However, the present invention is not limited to this implementation. It is acceptable if, in consideration of the capacity of the EEPROM 310 and the cost, only one language comprising the official language of the destination of the product is used, such as Japanese, English, French, German, Arabic, Russian, Spanish, Chinese or Korean.

As explained above, using these embodiments, a voice synthesizer, a language selection device and a speaker are used in a camera or a camera system so that the information regarding the control modes (functions) of the camera and the photo-taking scenes (the photo-taking dates and titles) may be provided by means of voice sounds, and therefore, the user may learn the meanings of the displayed abbreviations, symbols or codes without referring to the instruction manual of the camera. In addition, because the number of characters that may be expressed is large when the information is given verbally, even long titles and long explanations of functions that may not be fully displayed in the screen of the liquid crystal display unit of the camera may be provided in their entirety. As a result, the help function available in a personal computer may be incorporated into the camera.

Furthermore, by storing in a single language selection device data and programs to pronounce many languages, the need to replace the ROM depending on the destination of shipment is eliminated and multiple languages may be accommodated using one set of specifications. It also enables shipments to multi-ethnic nations where more than one official language is used.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A camera system comprising:

a camera main unit; and a peripheral device, wherein the camera main unit has (i) a first display unit that displays a first set of information that pertains to function of the camera by means of character, symbol or code or a combination thereof, and (ii) a transmitter that sends signals corresponding to the first set of information thus displayed, and the peripheral device has (i) a receiver that receives the signals sent from the transmitter, (ii) a second information s et forming unit that forms in accordance with the signals received a second set of information having the same contents as the first set of information, (iii) a second display unit that displays the second set of information by means of characters, symbols or codes or a combination thereof, and (iv) a voice synthesizer that provides the second set of information by means of voice sounds.

2. A camera system of claim 1, wherein the screen of the second display unit is larger than the screen of the first display unit and the second set of information includes information that is not included in the first set of information.

3. A camera system of claim 1, further comprising:

a language selection device that selects from at least two languages and provides the second set of information by means of voice sounds from the voice synthesizer using the selected language.

4. A camera system of claim 1, further comprising:

a language selection device that selects from at least two languages and displays the first and second sets of information in the first and second display units and provides the second set of information by means of voice sounds from the voice synthesizer using the selected language.

5. A camera system of claim 1, wherein the peripheral device is detachable from the camera main unit.

6. A camera system comprising:

a camera main unit; and a peripheral device, wherein the camera main unit has (i) a first display unit that displays a first set of information that pertains to function of the camera and photo-taking scenes by means of character, symbol or code or a combination thereof, (ii) a transmitter that sends signals corresponding to the first set of information thus displayed, and (iii) a recording device that records a second set of information that pertains to the photo-taking scenes in a recording area of a film, and the peripheral device has (i) a receiver that receives the signals sent from the transmitter, (ii) a second information set forming unit that forms in accordance with the signals received a second set of information having the same contents as the first set of information, (iii) a second display unit that displays the second set of information by means of character, symbol or code or a combination thereof, and (iv) a voice synthesizer that provides the second set of information by means of voice sounds.

7. A camera system of claim 6, wherein the first and second sets of information that pertain to the photo-taking scenes are selected by an user from among preset multiple sets of information.

8. A camera system of claim 6, wherein the first and second sets of information that pertain to the photo-taking scenes each comprise an array of characters sequentially input by an user.

9. A device connectable to a camera having a main camera unit that includes (i) a first display unit that displays a first set of information that pertains to function of the camera by means of character, symbol or code or a combination thereof, and (ii) a transmitter that sends signals corresponding to the first set of information thus displayed, said device comprising:

a receiver that receives the signals sent from the transmitter;

a second information set forming unit that forms, in accordance with the signals received, a second information set of information having the same contents as the first set of information;

a second display unit that displays the second set of information by means of characters, symbols or codes or a combination thereof, and a voice synthesizer that provides the second set of information by means of voice sounds.

* * * * *